Aug. 14, 1945.                J. W. SLOPER                2,381,933
                                PLANCHETTE
                            Filed April 28, 1944
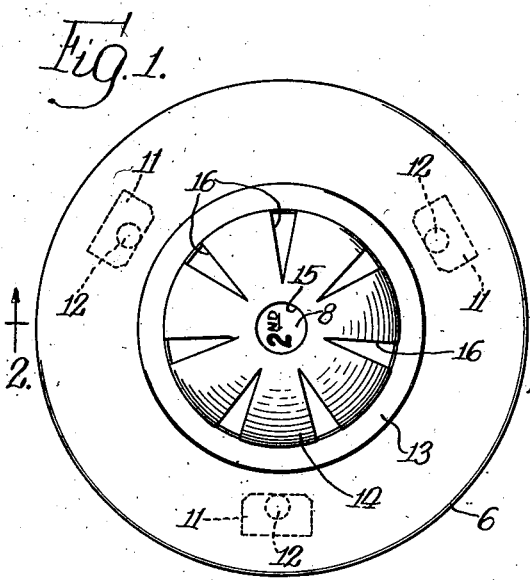
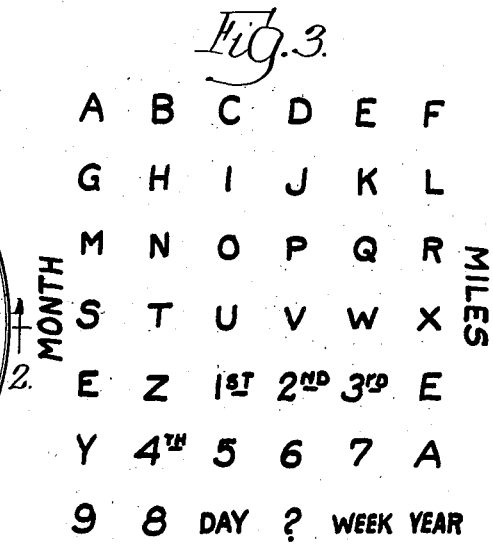
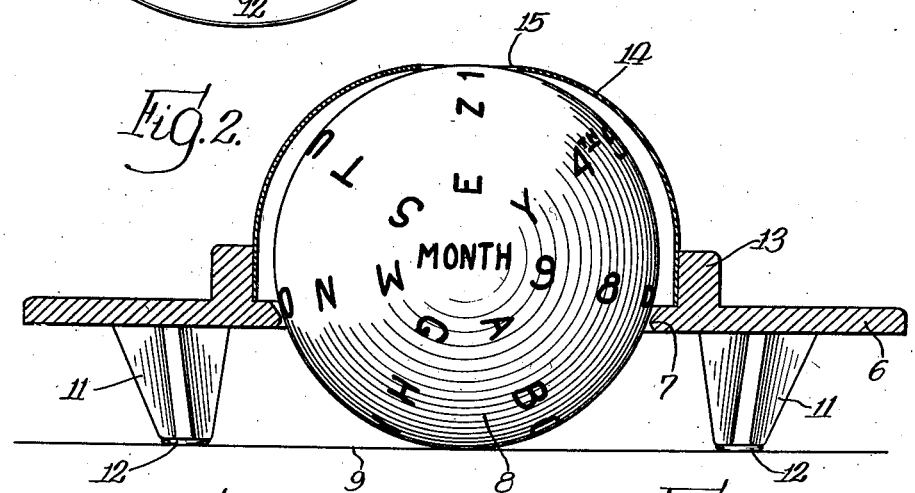
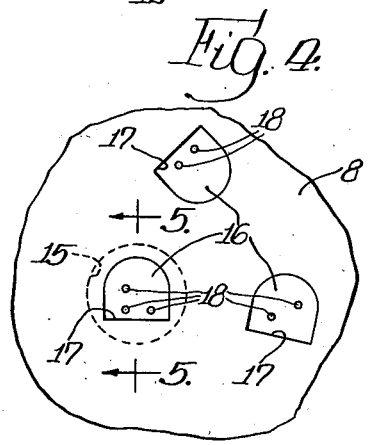
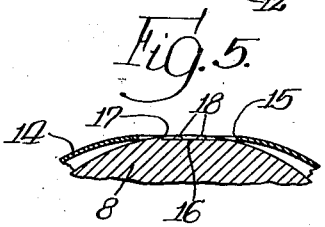
INVENTOR.
Joseph W. Sloper,
BY Patented Aug. 14, 1945

2,381,933

UNITED STATES PATENT OFFICE 2,381,933

PLANCHETTE

Joseph W. Sloper, Crystal Lake, Ill.

Application April 28, 1944, Serial No. 533,167

8 Claims. (Cl. 273—161)

This invention relates to devices generally known as planchettes, through which answers to questions put by the users are derived.

The most common type of planchette comprises a finger board upon which the fingers of the users are rested, the board being supported upon casters or other supporting means enabling it to move readily over a surface equipped with indicia, such as letters, numbers and the like, the finger board being provided with a pointer by which the characters on the surface are selected to form the answers to the questions.

The purpose of my present invention is to provide a device for a similar purpose which will embody in one article the finger board, the character bearing surface and the indicator. The device is, therefore, simpler and more compact than the two part device heretofore employed.

Another object of my invention is to provide a planchette in which the characters from which selections are made in the use of the device are concealed from the view of the users, thereby precluding voluntary manipulation of the device so as to cause the selection of any particular character.

Another object of my invention is to provide a planchette which is adapted to have the characters carried thereby formed in Braille, thereby enabling the device to be used by the blind.

Another purpose is to provide a device which will be simple in construction, economical to manufacture, easy to operate and one which will be durable in use.

Other objects and many of the inherent advantages of the device will be readily appreciated as the same becomes better understood by reference to the following description when considered in connection with the accompanying drawing.

On the drawing,

Fig. 1 is a plan view of a planchette embodying my invention;

Fig. 2 is a sectional view through the frame structure on the line 2—2 of Fig. 1, the spherical member being in elevation;

Fig. 3 illustrates the arrangement of the characters on the spherical member;

Fig. 4 is an enlarged fragment of a spherical member equipped with Braille characters; and Fig. 5 is an enlarged fragmentary sectional view through one of the characters taken on the line 5—5 of Fig. 4.

Referring to the drawing more in detail, reference character 6 indicates generally a platform which serves as a finger board upon which the fingers of the users are lightly rested. This platform is preferably circular in form and is provided with a centrally disposed opening 7 of slightly smaller diameter than a spherical member 8 which is positioned in and extends through the opening. The relative diameters of the ball and the circular opening are such that the ball projects downwardly through the opening so that it contacts with and rests upon a supporting surface 9, which ordinarily is a smooth topped table. When the platform is lifted, however, it lifts the ball with it. This ball may be made of any suitable material, such as plastic, rubber, wood, or the like, but I have found that the best results are secured when the ball is made of wood.

The platform is supported upon three legs 11. To facilitate sliding movements of the platform over the surface 9 which result in rotary movements of the ball, the bottom of each leg is preferably provided with a slide caster 12 or other suitable anti-friction means. An upstanding rim or flange 13 on the platform surrounding the opening 7 serves to retain in position a removable cover or enclosure 14, which is dome-shaped and seats within the flange 13, as illustrated in Fig. 2. This dome substantially conceals the ball from view, except at the top, where the dome is provided with a sight opening 15 through which that portion of the ball disposed beneath the opening may be observed or felt. For ventilation purposes the dome is provided with a plurality of openings 16 of any preferred shape, but of such restricted size that the characters on the ball cannot be readily seen through them.

The ball is provided on its surface with characters or indicia consisting of letters, figures and words which may be varied in character and arrangement. Preferably, however, they are arranged as illustrated in Fig. 3, wherein the characters are shown disposed upon a flat surface instead of upon the surface of a sphere, as in Fig. 2.

The characters may be printed or stamped on or impressed in the surface of the spherical member, and to adapt the device for use by the blind the characters may be applied in Braille. In Figs. 4 and 5 I have illustrated the application of the Braille characters to the sphere. For each character the surface of the sphere is formed with a slight depression, as indicated at 16, which terminates along one edge in an abrupt vertical shoulder 17 forming the base line for the character. The character itself, which consists of a plurality of dots 18 formed in relief upon a flat surface of the depression 16, is disposed in standard relation to the shoulder 17 which forms the base line for the character. When the Braille system of characters is applied to the ball, these characters are felt through the opening 15 in the dome by the fingers of the users, instead of being visually observed as would ordinarily be done.

When the device is to be used it is placed upon a smooth surface, such as a table top, and the users (usually two in number) rest their fingers of both hands lightly upon the upper surface of the platform 6. Sliding movement of the platform upon the supporting surface under suitable stimulus will impart a rotational movement to the ball by reason of its frictional contact with the underlying surface, thereby bringing different characters into registration with the opening 15. Since the movement is stopped when the requisite character becomes aligned with the opening 15, this cessation affords an opportunity for the Braille reader to determine by touch through the opening 15 the character which has been presented. Otherwise, visual observation of the presented character attains the same result.

It should be apparent from the foregoing that I have provided a planchette in which the character bearing member and the movable platform are embodied in one unitary structure. The concealment of the characters on the spherical member by the dome precludes any conscious manipulation by the users which might be occasioned by the ability to observe the approaching characters. Consequently, the disclosures made by the device become more interesting.

The structural details may be varied within considerable limits without departing from the spirit of the invention as defined in the following claims.

I claim:

1. A planchette, comprising a platform having a central opening, a plurality of legs slidably supporting said platform, a ball loosely disposed in said opening so as to rest upon the flat surface on which said legs are disposed, the surface of said ball being provided with characters, and a dome carried by said platform and enclosing the upper portion of said ball, said dome being provided with a sight opening through which the characters on said ball may be observed.

2. A planchette, comprising a platform provided with a central opening, means for supporting said board in horizontal position a predetermined distance above a supporting surface, a spherical member of greater diameter than said opening extending downwardly through the opening sufficiently to contact and be supported by said surface, said spherical member being provided on its surface with characters, and an enclosing means surrounding the upper portion of the spherical member, said enclosing means being provided with an opening through which said characters may be recognized as they are brought into registration therewith upon movement of the planchette over said surface.

3. A planchette, comprising a platform providing a flat circular finger board provided with a round central opening, a plurality of legs slidably supporting said platform, a ball of larger diameter than said opening projecting downwardly through the opening a distance slightly greater than the length of the supporting legs, and means for concealing the portion of the ball projecting above the platform, said concealing means being provided with an opening through which characters carried by said ball may be recognized.

4. A planchette, comprising a circular platform, a plurality of legs supporting the same, said platform being provided with a central opening, a spherical member provided on its periphery with characters, said member being of greater diameter than the opening in the platform and extending downwardly through said opening, and a cover enclosing the upper portion of said ball and provided with an opening through which the ball characters may be apprehended.

5. A planchette, comprising a finger board provided with an opening, legs supporting said finger board, a ball provided on its surface with characters disposed in said opening and adapted to be supported on the surface upon which said legs rest, whereby a sliding movement of said finger board is converted into a rotary movement of said ball, and means for substantially concealing the major portion of said ball while exposing a limited portion thereof for observation.

6. A planchette, comprising a ball provided on its surface with characters, a finger board provided with an opening through which said ball projects and with supporting legs, and means for enclosing said ball, said means being provided with an opening through which the characters on the ball may be apprehended.

7. A planchette, comprising a spherical member provided on its surface with depressions, characters formed in relief upon the bottoms of said depressions, a finger board provided with an opening in which said ball is located, said finger board being slidably supported upon supporting legs, and means for concealing all but a limited portion of the area of said ball.

8. A planchette, comprising a ball provided on its surface with Braille characters, a finger board provided with an opening in which said ball is located, said finger board being slidably supported so that sliding movement thereof is converted into rotary movement of the ball, and means carried by the finger board for concealing said ball, said means being provided with an opening through which the characters on the ball may be apprehended.

JOSEPH W. SLOPER.